United States Patent [19]
Schrader

[11] Patent Number: 6,149,361
[45] Date of Patent: Nov. 21, 2000

[54] SECUREMENT DEVICE

[75] Inventor: Darren Schrader, Portland, Oreg.

[73] Assignee: Schrader Dane Corporation, Portland, Oreg.

[21] Appl. No.: 09/137,656

[22] Filed: Aug. 20, 1998

Related U.S. Application Data

[63] Continuation-in-part of application No. 08/785,924, Jan. 21, 1997, abandoned.

[51] Int. Cl.$^7$ ........................................................ B60P 7/08
[52] U.S. Cl. .......................... 410/102; 410/97; 410/106; 410/108; 410/111
[58] Field of Search ................................ 410/96, 97, 101, 410/102, 104–106, 108, 111, 115, 116, 120, 143; 24/68 CD, 265 CD, 128, 130, 115 K, 115 M; 248/499

[56] References Cited

U.S. PATENT DOCUMENTS

| | | | |
|---|---|---|---|
| 1,521,619 | 1/1925 | Haas | 24/128 X |
| 3,119,160 | 1/1964 | Hoppeler | 24/128 X |
| 3,698,678 | 10/1972 | Bowers | 410/105 |
| 3,713,606 | 1/1973 | Bowers | 410/105 |
| 4,198,020 | 4/1980 | Walker et al. | 248/499 X |
| 4,257,592 | 3/1981 | Jones | 24/115 K |
| 4,818,006 | 4/1989 | Arndt | 410/110 X |
| 4,969,784 | 11/1990 | Yanke | 410/104 |
| 5,020,948 | 6/1991 | Ihara | 410/105 |
| 5,494,388 | 2/1996 | Stevens | 410/112 |

*Primary Examiner*—Stephen T. Gordon
*Attorney, Agent, or Firm*—Robert L. Harrington

[57] ABSTRACT

A securement device for securing an item in position. A member has an elongate slot along its length and has configured openings at intervals along the length of the slot. Cords are stored on or in the member. A neck portion of the head end of the cord is movable along the slot and into any one of the configured openings. A desired length of cord is withdrawn through the configured opening and attached to an item to secure an item in position.

9 Claims, 4 Drawing Sheets

SECUREMENT DEVICE

This application is a continuation-in-part of application (s) application Ser. No. 08/785,924 filed on Jan. 21, 1997 and now abandoned.

FIELD OF THE INVENTION

This invention relates to a securement device used for securing items within a container, on a rack, in a truck bed or the like where the securement device is housed in a portion of the container and available for use as needed.

BACKGROUND OF THE INVENTION

When hauling items in an open truck bed, as an example, the items may occupy only a portion of the truck bed space and can move about in the truck bed during transportation. Such movement is highly undesirable as it can be destructive and dangerous. A common solution is to tie the items to the truck bed walls. Truck beds are commonly provided with brackets of all kinds and shapes on the floors and side walls. Ropes, wire, elastic cords (bungee cords) and the like are used to secure the items to the brackets.

A very common problem encountered is the failure to have access to ropes or elastic cords when there is a need for them. Elastic cords and ropes have a way of disappearing when not in use and a common complaint is not having those items in ones possession when needed and furthermore not having the right length of cord or rope for the particular securement need.

It is an object of the present invention to provide a securement device incorporated into the container (truck bed, rack or the like) so that it is always available and is furthermore adjustable in length for different job needs.

BRIEF DESCRIPTION OF THE INVENTION

Many, if not most, racks, truck beds and containers have elongated tubular portions, e.g., the truck bed rail of a pick-up truck, which can house a cord or rope. This invention takes advantage of elongated tubular portions or in the alternative, a tubular portion is provided. In the preferred embodiment of the invention, the elongated tubular portion is provided with a slot extended substantially along the length of the tube. A configured opening is provided at intervals along the length of the slot. An elastic cord, rope, cable, wire and the like (hereafter collectively referred to as a cord) is provided with a connector head end portion at each end of the cord. The head end portion has a reduced neck section. The cord is installed in the tube and is extendable out of any of the configured openings.

When securement of an item is desired one head end is moved along the slot and into one of the configured openings. The cord is drawn through the opening to expose the desired cord length. The opposite head end is then either secured to the slot or positioned in another of the configured openings. When the opposite head end is positioned in one of the configured openings, another length of cored may be withdrawn. The extending length (or lengths) of cord is secured to the item in a conventional manner to secure the item in position.

There are a number of variations to satisfy the numerous securement needs and the invention and these numerous variations will be better understood and appreciated with reference to the following detailed description and drawings referred to therein.

BRIEF DESCRIPTION OF THE DRAWINGS

FIGS. 2A and 2B are alternate views of a head end of a cord of the securement device e.g., as if taken on view lines 2—2 of FIG. 4;

DESCRIPTION OF THE PREFERRED EMBODIMENT

Figure 1:
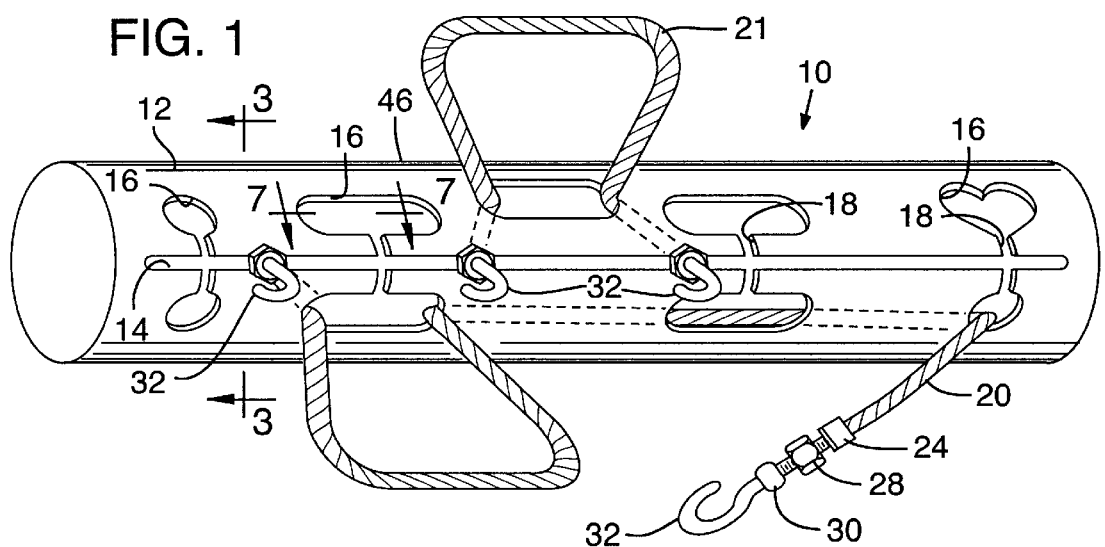
FIG. 1 is a view of a securement device of the present invention.
Figure 4:
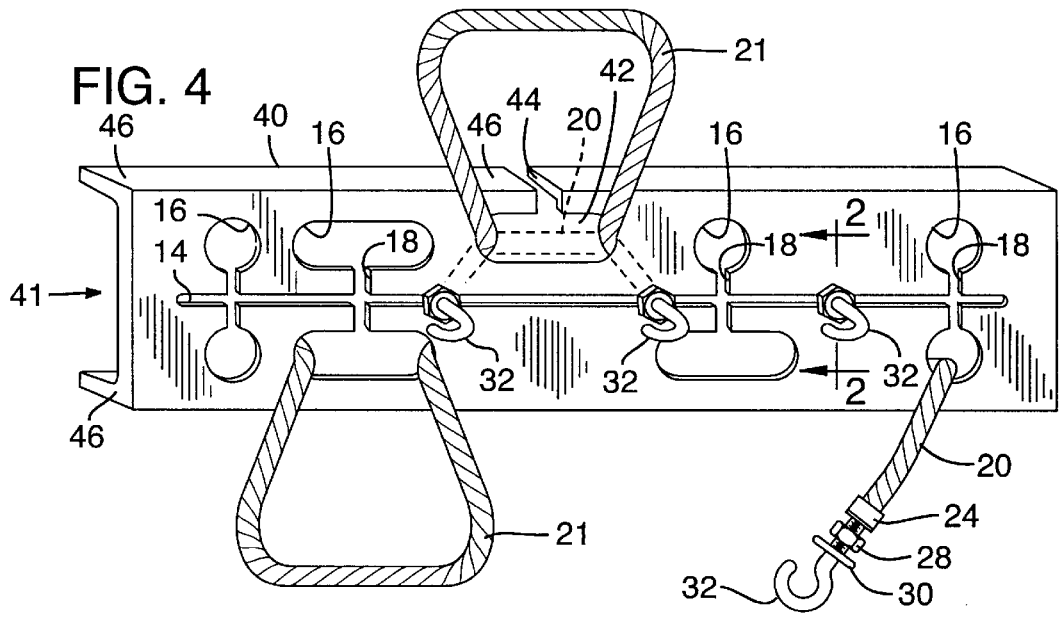
FIG. 4 is a view of another embodiment of a securement device.

FIG. 1 illustrates one embodiment of a securement device 10 of the present invention. The device 10 in this embodiment has a hollow member 12, such as a cylinder. Other shapes may be utilized as well such as square, rectangular, triangular and so forth. The member 12 has an elongate slot 14 that extends substantially along its longitudinal length. The length of the slot is determined in part on the end use of the securement device 10 and is of a length to suit. Positioned at intervals along the length of the slot 14 are configured openings 16. The openings 16 are joined to the slot 14 by a connecting slot 18. The shape of the openings 16 may be varied one from the other. Some examples of the varied openings 16 are illustrated in FIGS. 1 and 4.

The member 12 is arranged to house cords 20 within its cavity. The diameter of the cords 20 is preferably greater than the width of the slot 14. The cord 20 is extendable out of the openings 16. The cords 20 may be of various types, such as elastic, rope, cable and the like. In this preferred embodiment the cord 20 is elastic such as the well-known bungee cord.

Figure 2B:
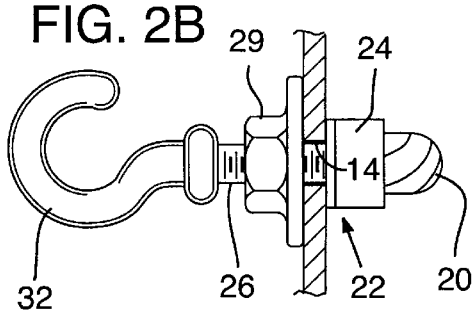
Figure 3:
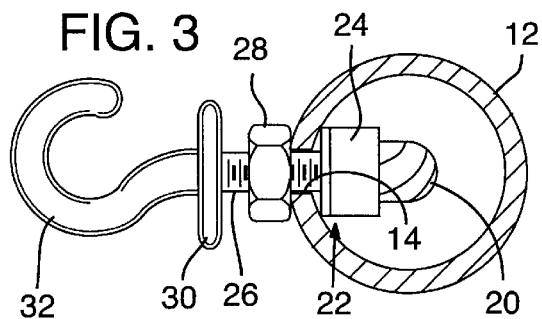
FIG. 3 is a sectional view as viewed on view lines 3—3 of FIG. 1 showing the head end of the cord in a slot of the securement device of FIG. 1.

Refer now to FIG. 2A which illustrates a portion of the cord 20 and the head 22 which is part of a head assembly attached thereto. The head 22 is also referred to as the head end of the cord 20. The cord 20 is fixedly attached to a sleeve 24 of the head 22 in a conventional manner. The diameter of the head 22 (including the sleeve 24) is greater than the width of the slot 14. The head 22 is, however, sized so that it may be passed through any of the openings 16 in the member 12 of FIG. 1. The remainder of the head assembly includes a shank 26 (neck portion) which extends from the head 22 and is threaded to receive a nut 28. The diameter of the shank 26 is slightly less than the width of the slot 14 in the member 12. A flange 30 is mounted on the end of the shank 26. The flange 30 is configured so that it will not pass through the openings 16 of the member 12. A conventional attachment device 32 is attached to the flange 30. In this embodiment, the device 32 is a conventional J-type hook. Other devices 32 may be utilized, such as buckles, rope loops, cables and the like. The flange 30 is preferably removably mounted to the shank 26 to facilitate replacing the cord 20 or attachment devices 32. FIG. 2B illustrates another example of an arrangement of the head end 22 of the cord 20 and the mounting of an attachment device 32. As shown a washer head or flange nut 29 is threadably mounted on the shank 26. The nut 29, like the flange 30 of FIGS. 2A and 3 is large enough such that it will not pass through the openings 16. The device 32 is removably mounted on the end of the shank 26.

Refer now to FIG. 3 of the drawings. As shown, the shank 26 extended from the head end 22 of the cord 20 is slidably movable in the slot 14. Further the head end 22 when in the slot 14 may be locked in position by tightening the nut 28 against the member 12 to lock the side walls of the member 12 between the nut 28 and the head 22. The arrangement of the head end of FIG. 2B is similarly locked in position in the slot 14 by the flange nut 29 being tightened against the member 40 to lock the side walls of the member 40 between the flange nut 29 and the head 22.

Referring again to FIG. 1, the head end 22 of the cord 20 is slidably movable in the slot 14 and is movable into any one of the openings 16 via the connecting slot 18. When the head end 22 of the cord 20 is in an opening 16, the cord 20 may be withdrawn out of the member 12 through the opening 16. The length of the cord 20 withdrawn out of the opening 16 is controlled by the position of the opposite head end 22 of the cord 20. The opposite head end is positioned by slidably moving it along the slot 14 to a desired position where it is locked in position by the nut 28. Alternatively the opposite head end 22 is moved into another opening 16. By adjusting the relative positions of the head ends of the cord 20, the length withdrawn may be controlled. It will be appreciated that both head ends 22 of the cord 20 may be withdrawn out of openings 16 to provide a length of cord 20 extending out of each opening from which the cord is withdrawn.

There are occasions when a loop is needed to secure an item. This is accomplished by pulling a center portion of the cord 20 out of an opening 16 as shown in FIG. 1 by the loop 21. The size of the loop 21 is controlled by the position of the head ends 22 on either side of the opening 16 from which the loop 21 is withdrawn. As previously mentioned the head ends may be secured at a position along the slot 14 or alternatively may be positioned in other openings 16.

The arrangement of the slot 14 and the multiple openings 16 permit the use of multiple cords 20 in the member 12. Each head end 22 of the cord 20 is positioned by sliding it along the slot 14 to a desired position in the slot or alternatively by moving the head end into one of the openings 16.

FIG. 4 illustrates another embodiment of the securement device of the present invention. An elongate member 40, such as an elongate channel bar has an elongate slot 14. Configured openings 16 are provided along the length of the slot 14 in the same manner as the member 12 of FIG. 1. The cord 20 is not stored within an enclosure such as the tubular member 12 but are placed between edges 46 which form an open sided cavity 41 opposite the side from which the attachment devices 32 protrude. The head ends 22 are adjustably movable along the slot 14 and into the openings 16 in the same manner as was explained for member 12 of FIG. 1. A length of the cord 20 may be withdrawn from an opening 16, both head ends may be withdrawn from two openings 16 and/or a loop may be withdrawn from an opening 16 as previously explained.

The member 40 has another opening 42. A slot 44 extends from the upper edge 46 of the member 40 to the opening 42. The slot 44 is sufficiently wide such that the cord 20 may be passed through it to reside in the opening 42. A length of the cord 20 may be pulled from the back side of the member 40 and inserted through the slot 44 to be placed in the opening 42. A length of the cord may be withdrawn to form a loop 21. The opening 42 is also used for securement of a head end 22 of a cord 20. The cord 20 is inserted through the slot 44 with the flange 30 (or nut 29) in engagement with the surface of the member 40 surrounding the opening 42.

The configuration of the slots 14 and the openings 16 in the members 12 and 40 permit the use of multiple cords 20. By selectively placing the head ends 22 of one cord in openings 16 permits the slidable adjustment of another cord 20. The cords 20 may be of varying lengths and are selected to suit the needs of a user. The members 12, 40 are arranged to store the cords 12 and are deployed when needed.

Figure 5:
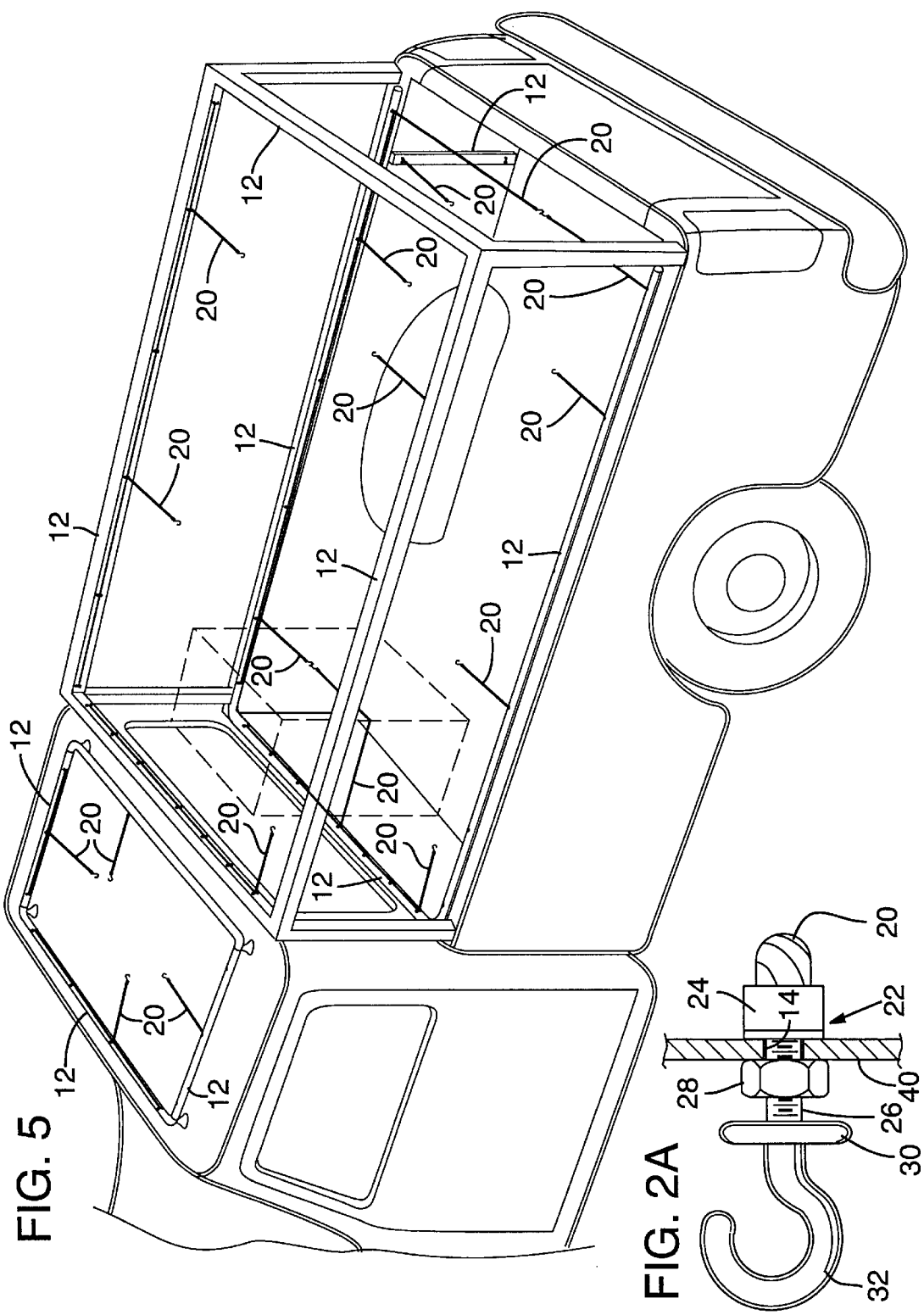
FIG. 5 is a view illustrating examples of the securement device.

FIG. 5 illustrates but a few examples of the securement device as applied to a vehicle. In this illustration, members 12 are shown applied to the vehicle however the member 40 may be utilized as well as variations of either. As shown, a member 12 is mounted to the side rails of the vehicle cargo bed and to the side walls of the cargo bed. Also shown is a rack mounted on one side of the bed with the members 12 utilized as frame works for the rack. The members 12 are also utilized on a rack, such as a ski rack on the top of the cab of the vehicle. The cord 20 is extended out of the member 12 to secure an item in position relative to the member 12, whether it is in the vehicle cargo bed or on one of the racks.

Figure 6:
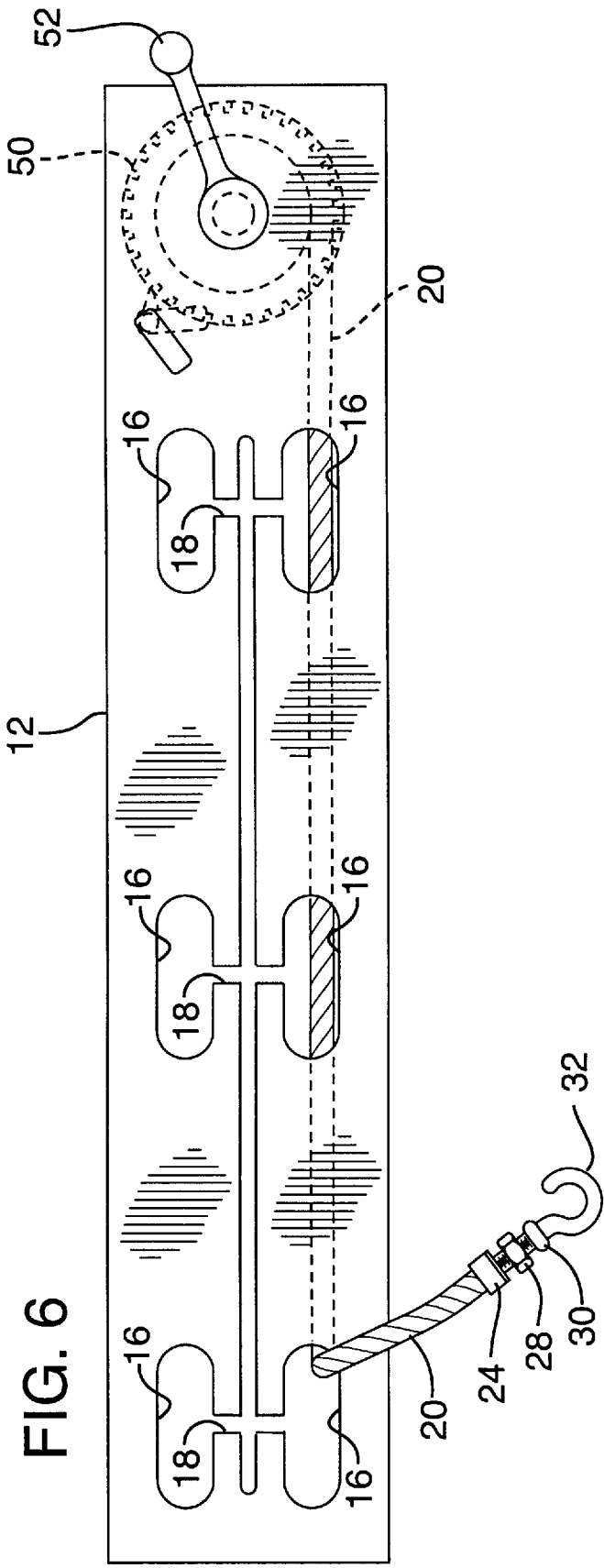
FIG. 6 is a view of the securement device of FIG. 1 and a take up spool.

FIG. 6 illustrates a member 12 that has a take-up spool or reel 50 mounted at one end. While the spool 50 is only illustrated at one end of the member 12, additional spools 50 may be provided at the other end and along the length of the member 12. The spool 50 is arranged to store and deploy the cord 20. The spool 50 is of the type that is lockable in a rotative position to maintain the cord 20 in a fixed position. To deploy a length of cord 20 the spool is un-locked and a length of cord 20 is simply pulled to unwind the cord from the spool 50. The spool has a handle 52 to facilitate winding the cord 20 onto the spool 50. Tension thus may be applied to the cord 20.

Figure 7:
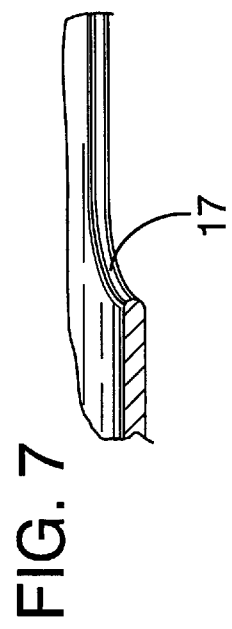
FIG. 7 is a view of an opening as viewed on view lines 7—7 of FIG. 1.

The openings 16 of the members 12, 40 have a radiused edge 17 as illustrated in FIG. 7. The radiused edges 17 of the openings 16 provide a smooth exit path for the cord 20 when deployed out of the openings 16. The radiused edges also reduce wear on the cords 20.

Figure 8:
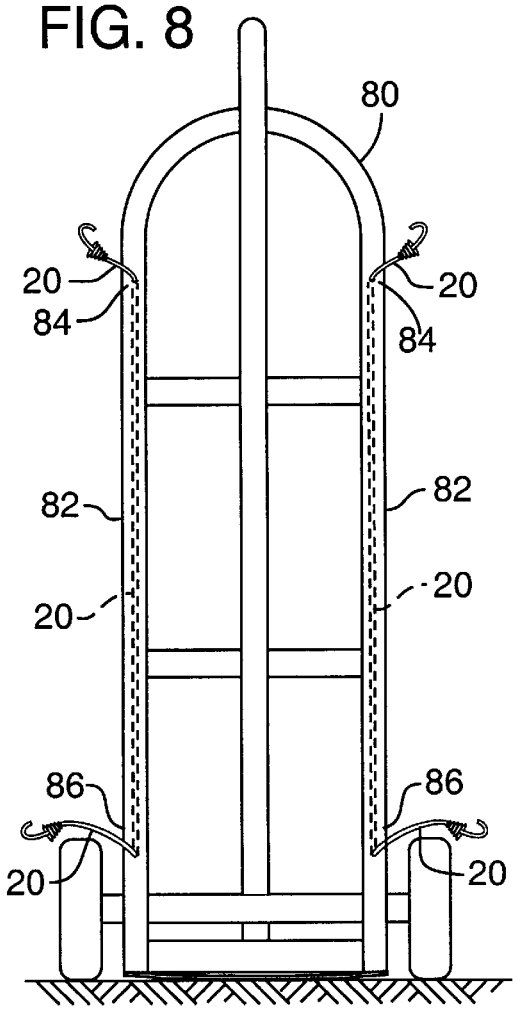
FIG. 8 is a view of a hand truck incorporating the securement device of the present invention.
Figure 9:
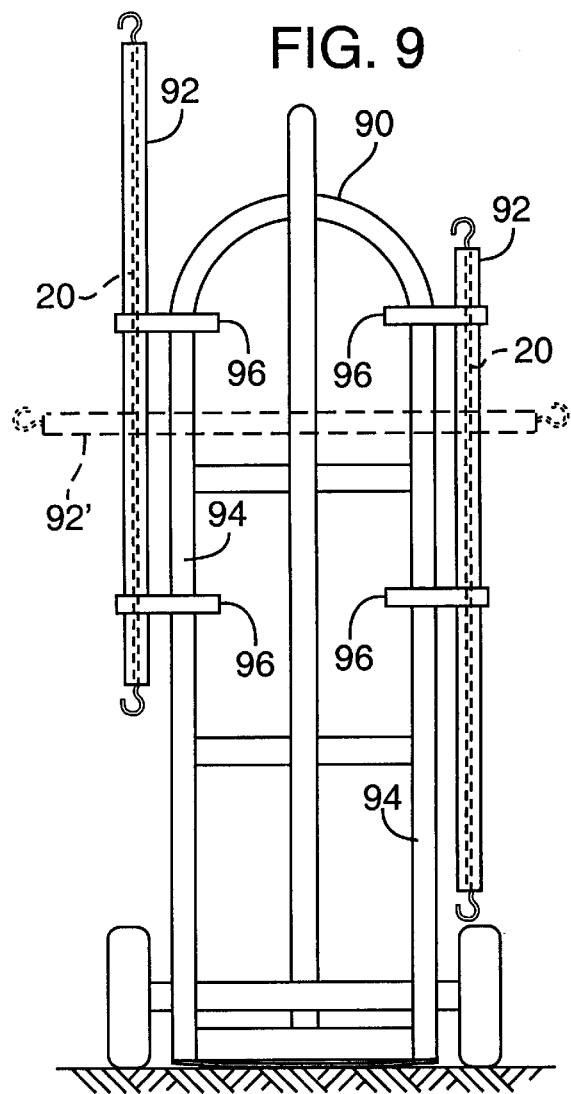
FIG. 9 is a view of a hand truck that is retrofitted to incorporate the securement device of the present invention.
Figure 10:
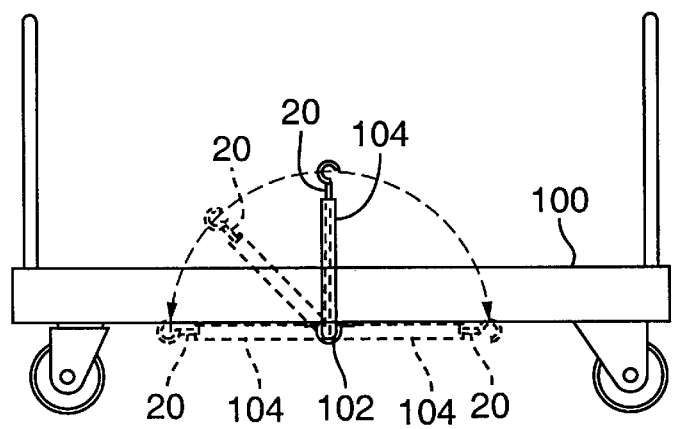
FIG. 10 is a view of another hand truck incorporating the securement device of the present invention.

FIGS. 8, 9 and 10 illustrate other applications of the securement device of the present invention. FIG. 8 illustrates a hand truck 80 that is manufactured to incorporate the securement device of the present invention. An elastic cord or cords 20 are incorporated in each of the side rails 82 of the hand cart 80. The elastic cords are extendable through openings provided in the top portion 84 of each rail 82 and are also extendable through openings provided in the lower portion 86 of each rail 82. An item is secured to the hand truck using a desired combination of the cords 20.

FIG. 9 illustrates a hand truck 90 that is retrofitted to incorporate a securement device of the present invention. Tubes 92 are adjustably secured to the side rails 94 of the hand truck 90. Tubes 92 are secured to the rails 94 by adjustable clamps 96 which secures the tubes 92 to the rails 94. As shown, the tubes 92 are adjustably mounted on the clamps 96 and provide for the adjustment of the tubes 92 upwardly and downwardly relative to the hand truck 90. Each tube 92 has elongate cords 20 that are extendable from either or both the open top or the open bottom of the tube 92 to provide securement of an item on the hand truck 90. It will be appreciated that the tube 92 may also be mounted in a horizontal position as indicated by the dash line 92'. The tube 92' in the horizontal position would be secured to the vertical rails 94 by clamps 96.

FIG. 10 illustrates a flat bed cargo truck that incorporates another form of the securement device of the present invention. The cargo truck 100 has a tube 102 mounted on the underside of the cargo bed. Tubes 104 that are formed in a right angle are slidably inserted into the tube 102 and cooperatively form a channel from the open end of one tube 104 through tube 102 to the open end of the other tube 104. An elastic cord or cords 20 reside in the channel and extend out through the open ends as illustrated in FIG. 10. When not in use, the tubes 104 may be pivoted downwardly and moved inward in the tube 102 such that the tube 104 lies under the carriage of the truck 100. The tube 104 is slidably movable outward and pivotably movable upward when used to secure cargo on the bed of the truck 100. The elongate cord or cords 20 are extendable out of the free ends of the tubes 104 so that cargo may be secured to the bed of the truck 100.

Those skilled in the art will recognize that modifications and variations may be made without departing from the true spirit and scope of the invention. Examples of the securement device have been illustrated in FIG. 5. The invention is not limited to the examples illustrated. The securement device is applicable to many other devices and apparatus. The securement device may for example be utilized on any device where securement of an item is required or desired. Other applications include but are not limited to hand trucks, shelving units, gate posts, automobile trunks, cargo hauling vehicles and bicycle racks to name a few. The invention is therefore not to be limited to the embodiments described and illustrated but is to be determined from the appended claims.

What is claimed is:

1. A securement system for a carrier comprising:

an elongated housing member affixed to a carrier and defining an elongated inner cavity extended lengthway of the elongated housing member and an outer wall;

a cord having opposed ends, the cord being substantially fully housed and retained in the elongated cavity with a substantial length thereof extended lengthway in the cavity during storage and non-use, and at least a substantial portion thereof extendable from the cavity for securing items to the carrier;

a configured opening in the housing member and into the cavity and said cord extendable from the cavity through the opening, an attachment device secured to one end of the cord and protruded from the configured opening, said attachment device having a configuration that prevents retraction of the attachment device completely through the configured opening and into the cavity to ensure a portion thereof exposed for manual withdrawal of the device and cord through the configured opening; and the other end of the cord secured to the housing member for permitting withdrawal of the attachment device and said one end of the cord from the cavity but preventing total removal of the cord from the housing member.

2. A securement system as defined in claim 1 wherein the cord is sufficiently elastic to be contracted in storage and stretchable to a workable length exterior of the cavity for securing an item to the carrier.

3. A securement system as defined in claim 1 wherein the housing member is tubular and the cavity is an enclosure.

4. A securement system for a carrier comprising:

an elongated housing member affixed to a carrier and defining an inner cavity and an outer wall;

a cord having opposed ends, the cord being substantially fully housed in the cavity for storage and at least a substantial portion thereof extendable from the cavity for securing items to the carrier;

a configured opening in the housing member and into the cavity and said cord extendable from the cavity through the opening, an attachment device secured to one end of the cord and protruded from the configured opening, said attachment device having a configuration that prevents retraction of the attachment device completely through the configured opening and into the cavity to ensure a portion thereof exposed for manual withdrawal of the device and cord through the configured opening; and the other end of the cord secured to the housing member which includes a slot in the wall of the housing member extended along the length thereof, a releasable fastener connected to the other end of the cord and configured to slide in the slot for positioning and securing said other end of the cord at a selected position along the length of the slot and thereby permitting withdrawal of the attachment device and said one end of the cord from the cavity but preventing total removal of the cord from the housing member.

5. A securement system as defined in claim 4 including a plurality of openings in the housing member in addition to said configured opening through which the cord can be withdrawn and said releasable fastener provided with a second attachment device, at least one of the plurality of openings in communication with said slot whereby the releasable fastener can be positioned in said at least one of the plurality of openings and the releasable fastener and other end of the cord being thereby withdrawable from the cavity for also securing items to be secured to the carrier.

6. A securement system as defined in claim 5 wherein the carrier is a truck box of a vehicle and a plurality of the housing members are provided for the truck box for storing cords and attachment devices from which the attachment devices and cords can be withdrawn for securing items to the truck box.

7. A securement system as defined in claim 6 wherein the cords are elastic.

8. A securement system as defined in claim 5 wherein said releasable fastener has a head and configured to have a neck portion between inner and outer enlarged portions, said neck portion sized to freely slide in the slot and both the inner and outer enlarged portions sized to prevent the passage of the head end either in or out of the cavity through the slot and the inner enlarged portion and not the outer enlarged portion sized to pass through the at least one of the plurality of openings for withdrawal of the releasable fastener and second attachment device through the opening and out of the cavity and not fully into the cavity.

9. A securement device as defined in claim 4 wherein said releasable fastener has a head end configured to have a threaded neck portion and an inner enlarged portion residing in the cavity and a nut outside the cavity and threadably engaged with the threaded neck portion, said threaded neck portion sized to fit the slot and with the nut screwed away from the housing member wall permitting sliding movement of the fastener along the slot and with the nut screwed into engagement with the housing member wall locking the fastener in position along the slot.

* * * * *